US008588062B1

(12) United States Patent
Pan et al.

(10) Patent No.: US 8,588,062 B1
(45) Date of Patent: Nov. 19, 2013

(54) APPLICATION BASED ACCESS SELECTION

(75) Inventors: James J. Pan, Cupertino, CA (US); Claudio R. Lima, San Jose, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 618 days.

(21) Appl. No.: 11/679,290

(22) Filed: Feb. 27, 2007

(51) Int. Cl.
*G01R 31/08* (2006.01)

(52) U.S. Cl.
USPC .............. 370/230; 370/328; 370/395.5

(58) Field of Classification Search
USPC ......... 370/230, 352–353, 392, 503, 435, 401, 370/329, 338; 455/414.1, 445; 709/203–224
See application file for complete search history.

(56) References Cited

U.S. PATENT DOCUMENTS

| | | | | |
|---|---|---|---|---|
| 5,818,843 A * | 10/1998 | Virdee et al. | ................ | 370/435 |
| 6,026,086 A * | 2/2000 | Lancelot et al. | ................ | 370/353 |
| 7,289,516 B2 * | 10/2007 | Huckett et al. | ............. | 370/395.5 |
| 7,693,056 B2 * | 4/2010 | Heissenbuttel et al. | ....... | 370/230 |
| 7,907,559 B2 * | 3/2011 | Fodor et al. | ................ | 370/328 |
| 8,023,479 B2 * | 9/2011 | Silver et al. | ................ | 370/338 |
| 8,078,722 B2 * | 12/2011 | Harvey et al. | ................ | 709/224 |
| 2002/0136174 A1 * | 9/2002 | Gleeson | ................ | 370/329 |
| 2004/0116119 A1 * | 6/2004 | Lewis et al. | ............. | 455/435.1 |
| 2005/0025164 A1 * | 2/2005 | Kavanagh et al. | ............. | 370/401 |
| 2005/0208913 A1 * | 9/2005 | Raisinghani et al. | ....... | 455/161.2 |
| 2005/0220107 A1 * | 10/2005 | DelRegno et al. | ............. | 370/392 |
| 2006/0056309 A1 * | 3/2006 | Maaniitty | ................ | 370/252 |
| 2006/0221933 A1 * | 10/2006 | Bauer et al. | ................ | 370/352 |
| 2007/0008884 A1 * | 1/2007 | Tang | ................ | 370/230 |
| 2007/0197227 A1 * | 8/2007 | Naqvi et al. | ................ | 455/445 |
| 2007/0211690 A1 * | 9/2007 | van Megen et al. | ............. | 370/351 |
| 2008/0075124 A1 * | 3/2008 | Fourcand | ................ | 370/503 |
| 2008/0151830 A1 * | 6/2008 | Leppisaari et al. | ............. | 370/329 |
| 2008/0192629 A1 * | 8/2008 | Chari | ................ | 370/230 |
| 2009/0092114 A1 * | 4/2009 | Feher | ................ | 370/338 |
| 2009/0149157 A9 * | 6/2009 | Gallagher et al. | ............. | 455/414.1 |
| 2010/0077022 A1 * | 3/2010 | Mikkelsen et al. | ............. | 709/203 |

OTHER PUBLICATIONS

Laurila et al, Application based access selection concept for all IP mobile terminals, 2002.*

* cited by examiner

*Primary Examiner* — Michael Thier
*Assistant Examiner* — Vincelas Louis

(57) ABSTRACT

An access selection system comprises an interface system configured to receive a plurality of traffic and transfer a first traffic of the plurality of traffic over a first access link of a plurality of access links wherein the plurality of traffic is generated by a plurality of applications. The access system further comprises a processing system coupled to the interface system and configured to process the first traffic of the plurality of traffic to determine a first application of the plurality of applications that generated the first traffic and select the first access link from the plurality of access links based on the first application.

14 Claims, 5 Drawing Sheets

APPLICATION BASED ACCESS SELECTION

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to telecommunications, and in particular, to access selection for application traffic.

2. Description of the Prior Art

Modern communication carriers utilize diverse types of access or transport technologies to carry diverse types of traffic. Some types of access are more expensive than other types of access. In addition, some types of traffic require higher priority treatment than other types of traffic. Furthermore, some types of traffic are more valuable to a carrier than other types of traffic.

Many types of traffic are generated by applications that are executed by or are otherwise running on devices, such as mobile phones, personal digital assistants, or the like. The various types of traffic that are generated by the various types of applications do not all share the same priority or performance requirements. For instance, voice traffic generally receives priority over data traffic and typically must be routed over higher performance links than data traffic.

Unfortunately, prior art systems and networks do not efficiently match traffic with transport technologies. Carriers often times transport low priority or low value traffic over expensive, high performance access links. Other times, carriers transport high priority or high value traffic over inexpensive, low quality links.

In a particular example of the prior art, voice traffic must be delivered quickly over a network, while simple data traffic need not be delivered as quickly. Some transport or access technologies, such as time division multiplexed links, are considered more reliable for voice traffic than other technologies, such as Ethernet links. However, carriers often times route voice traffic over Ethernet links while transporting simple data traffic over time division multiplexed links.

In addition to the varying performance requirements of different types of traffic, some types of traffic are more valuable to a carrier than other types of traffic. For instance, carriers are generally able to charge customers a premium for mobile broadband access, text messages, and ring tone downloads. In contrast, carriers are not able to charge customers a premium for basic services, such as voice calling. Unfortunately, carriers commonly transport high value traffic over inexpensive and lower quality access links, while transporting low value traffic over expensive performance access links.

The mismatch between traffic and transport results in degraded customer experiences. In addition, the mismatch between traffic and transport results in reduced carrier performance.

SUMMARY OF THE INVENTION

In an embodiment of the invention, a method of operating an access selection system comprises receiving a plurality of traffic wherein the plurality of traffic is generated by a plurality of applications, processing a first traffic of the plurality of traffic to determine a first application of the plurality of applications that generated the first traffic, selecting a first access link from a plurality of access links based on the first application, and transferring the first traffic over the first access link.

In an embodiment of the invention, a plurality of devices execute the plurality of applications to generate the plurality of traffic, wherein the plurality of devices transmit the plurality of traffic to the access selection system.

In an embodiment of the invention, the first traffic includes an application identifier that identifies the first application.

In an embodiment of the invention, the application identifier comprises a bit pattern.

In an embodiment of the invention, processing the first traffic to determine the first application comprises processing the bit pattern against a plurality of known bit patterns to select the first application from the plurality of applications.

In an embodiment of the invention, each known bit pattern of the plurality of known bit patterns is associated with a different one of the plurality of applications.

In an embodiment of the invention, the first access link comprises an Ethernet link.

In an embodiment of the invention, the first access link comprises a WiMax link.

In an embodiment of the invention, the first access link comprises a time division multiplexed (TDM) link.

In an embodiment of the invention, the first access link comprises a WiFi link.

In an embodiment of the invention, an access selection system comprises an interface system configured to receive a plurality of traffic and transfer a first traffic of the plurality of traffic over a first access link of a plurality of access links wherein the plurality of traffic is generated by a plurality of applications. The access system further comprises a processing system coupled to the interface system and configured to process the first traffic of the plurality of traffic to determine a first application of the plurality of applications that generated the first traffic and select the first access link from the plurality of access links based on the first application.

BRIEF DESCRIPTION OF THE DRAWINGS

The same reference number represents the same element on all drawings.

DETAILED DESCRIPTION OF THE PREFERRED EMBODIMENT

FIGS. 1-5 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
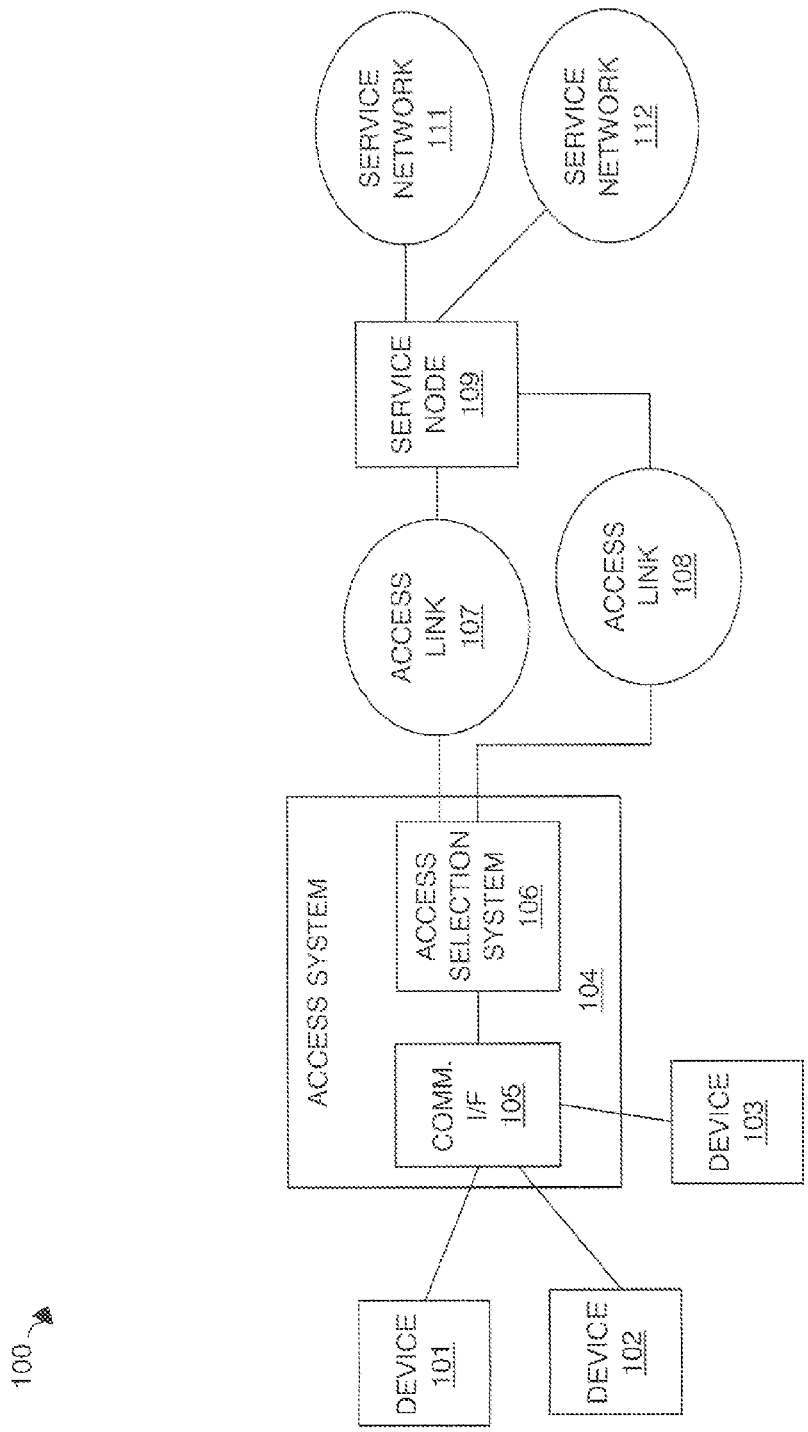
FIG. 1 illustrates a communication network in an embodiment of the invention.

FIG. 1 illustrates a communication network 100 in an embodiment of the invention. Communication network 100 includes access system 104, access links 107 and 108, service node 109, and service networks 111 and 112. Access system 104 further includes communication interface 105 and access selection system 106. Communication network 100 further includes devices 101, 102, and 103.

As illustrated in FIG. 1, devices 101, 102, and 103 are connected to communication interface 105. Communication interface 105 is connected to access selection system 106. Access selection system 106 is connected to access link 107 and access link 108. Access link 107 is connected to service node 109. Likewise, access link 108 is connected to service node 109. Service node 109 is connected to service networks 111 and 112.

Service network 111 or 112 could be any system, network, or collection of networks capable of providing a service to device 102. Examples of services include, but are not limited to, voice calling, video, text messaging, email, and data services. Other types of service are possible. Service network 111 or 112 could be, for example, a public internet, private intranet, the public switched telephone network, a cellular telephone network, a wide area data network, a local area network, or any combination thereof.

Service node 109 could be any system or collection of systems capable of processing traffic for delivery to or from service network 111 or 112. Service node 109 could be capable of controlling traffic, traffic sessions, application sessions, or the like. Examples of service node 109 could include a mobile switching center (MSC), base station controller (BSC), or any combination thereof.

Device 101, 102, or 103 could be any well known device or communication system, such as a mobile phone, a personal computer, a pager, or a personal digital assistant. In operation, device 101, 102, or 103 communicates with access system 104 to access a service provided by service network 111 or 112.

In particular, device 101, 102, or 103 exchanges traffic with communication interface 105. The traffic could include data generated by applications executed by or otherwise running on device 101, 102, or 103. Communication interface 105 interfaces the traffic to access selection system 106. Access selection system 106 transfers the traffic over either access link 107 or access link 108 to service node 109. Service node 109 then transfers the traffic to the service provided by either service network 111 or 112.

Examples of access system 104 could include, but are not limited to, base transceiver stations, wireless access points, or the like. It should be understood that, in some examples, access selection system 106 could be integrated with a base transceiver station or a wireless access point. In other examples, access selection system 106 could be employed separate from a base transceiver station or wireless access point.

In some examples, device 101, 102, or 103 could communicate with access system 104 and communication interface 105, via well known access protocols. For instance, device 101, 102, or 103 could be a wireless device capable of exchanging wireless communications with communication interface 105 via a CDMA, CDMA 2000, GSM, WiMax, EVDO, or Wifi protocol, or any iteration, progression, or combination thereof.

Access links 107 and 108 could comprise well known access links, such as communication backhaul links. For instance, access link 107 or 108 could comprise a time division multiplexed link, an Ethernet link provided by a cable operator, or a WiMax link. It should be understood that access system 104 could include elements capable of interfacing to access links 107 or 108 not shown for purposes of clarity.

Figure 2:
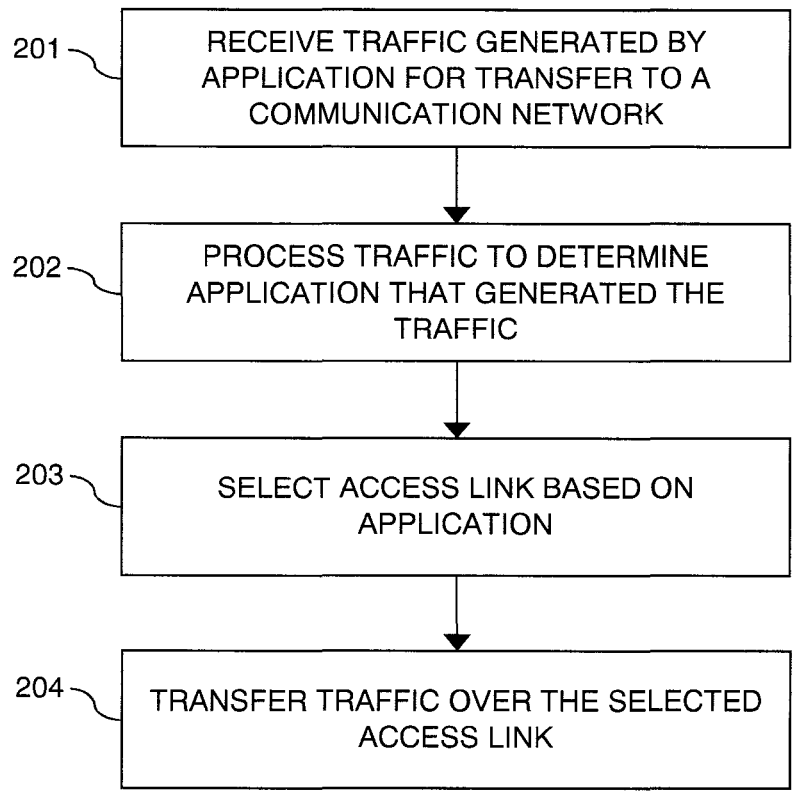
FIG. 2 illustrates the operation of an access selection system in an embodiment of the invention.

FIG. 2 illustrates the operation of access selection system 106 in an embodiment of the invention whereby access selection system 106 selects which access link 107 or 108 to utilize for transport of application traffic.

To begin, access selection system 106 receives traffic from communication interface 105 (Step 201) for transfer to either service network 111 or 112 over access link 107 or 108. As discussed above, the traffic is generated by device 101, 102, or 103 executing any one application of a number of applications capable of generating traffic. Examples of applications include, but are not limited to, voice calling, video, text messaging, email and other data applications.

In an example, the traffic could include an application identifier that identifies the application. The identifier could be a bit pattern. Access selection system 106 could include a first data structure, such as a table, that stores known application identifiers in association with the identity of applications. Each application identifier could be stored in association with one of the application identities. As discussed, in a case wherein the application identifiers are bit patterns, each bit pattern could be stored in association with one of the application identifies. For instance a first bit pattern could be associated with email. A second bit pattern could be associated with voice calling. A third bit pattern could be associated with text messaging. A further bit pattern could be associated with a video application. Other bit patterns and associated applications are possible.

In another example, the traffic could be generated without an application identifier. In such a case, access selection system 106 could inspect the traffic to determine the application that generated the traffic. For instance, the traffic could comprise packets or frames. Access selection system 106 could employ a deep packet inspection mechanism or scheme to inspect the payload of the traffic. Each possible application could generate traffic having identifiable patterns in the payload of the traffic. For example, voice traffic could have one payload pattern, while email traffic could have another payload pattern. Access selection system 106 could inspect the payload to determine a payload pattern. The payload pattern could then be compared to a known list of payload patterns and applications associated with the payload patterns. Access selection system 106 could then derive the identity of the application that generated the traffic from the pattern exhibited in the traffic payload.

It should be understood that the step of determining the application that generated the traffic could be performed on each instance of traffic, such as a frame or a packet, received into access system 102. However, the application could be determined on an intermittent or periodic basis.

Access selection system 106 could also include a second data structure, such as a table, that stores the identity of preferred access links for each application. Higher performance access links could be preferred for certain applications that require higher performance traffic, such as voice and video applications. In one example, a TDM link could be preferred for voice or video traffic. Access links having lesser performance characteristics could be preferred for certain applications that do not require high performance access links, such as email and other simple data applications. In one example, an Ethernet or WiMax link could be preferred for email, text, or data traffic. The data structure could indicate each access link and the preferred applications associated with each access link.

It should be understood that access links could be assigned or associated to application types based on factors other than the performance requirement of an application or the performance capabilities of an access link. For instance, a high cost access link could be preferred for an application based on the economic value of an application. Ring tones, for example, are considered high value applications. Therefore, a high cost access link may be preferred for ring tones. Likewise, text messaging is considered a high value application. Therefore, a high cost access link may be preferred for text messaging. Other applications, such as email, web surfing, and streaming media may be considered low value applications. Therefore, low cost access links may be preferred for traffic generated by those low value applications. Such relationships could be embodied in the table described above that stores application types in association with preferred access links.

Upon receiving the traffic, access selection system 106 processes the traffic to determine which one application of the number of applications generated the traffic (Step 202). For example, access selection system 106 could process the traffic to determine the application identifier. Access selection system 106 could then perform a lookup to the first data structure using the application identifier to determine the application identity stored in association with the application identifier.

After determining the associated application, access selection system 106 then selects from either access link 107 or access link 108 to use for transporting or transferring the traffic to service node 109 (step 203). For example, access selection system 106 could access and process the second data structure to determine the preferred access link (in this embodiment, either access link 107 or 108) for the application associated with the traffic.

Upon selecting the preferred access link, access selection system transfers the traffic over the selected access link 107 or 108 to service node 109 (Step 204). In one example, access selection system could include a routing function or routing system capable of routing traffic to either access link 107 or 108 based upon the preferred selection. In operation, service node 109 typically switches, routes, or otherwise directs a transfer of the traffic to the service provided by either service network 111 or 112.

Advantageously, communication network 100 and access selection system 106 allow a carrier to match traffic with preferred access links based on the application that generated the traffic. In this manner, low value traffic can be assigned to low cost access links. Furthermore, high value traffic can be assigned to high cost access links. Similarly, high performance traffic can be assigned to high performance access links. Likewise, low performance traffic can be assigned to low performance access links.

Figure 3:
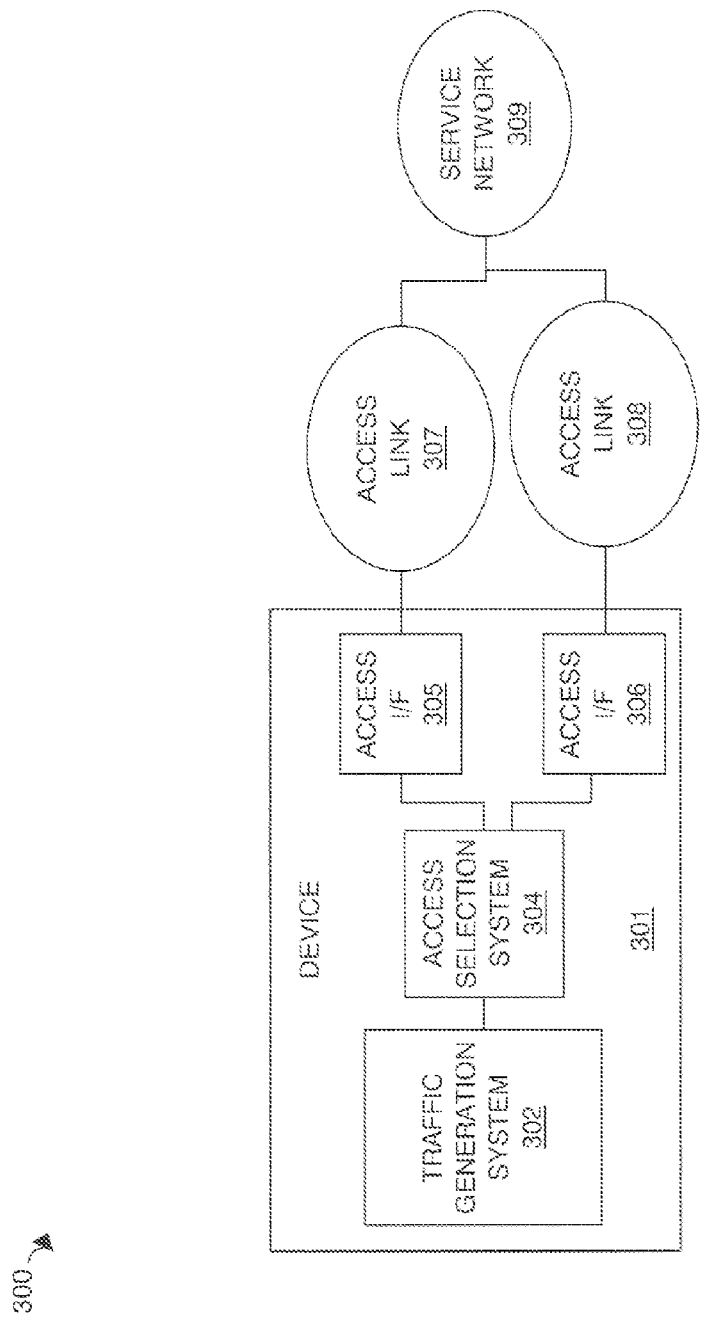
FIG. 3 illustrates a communication network in an embodiment of the invention.

FIG. 3 illustrates a communication network 300 in an embodiment of the invention. Communication network 300 includes device 301, access link 307, access link 308, and service network 309. Device 301 includes traffic generation system 302, access selection system 304, access interface 305, and access interface 306.

Device 301 could be connected to or otherwise in communication with access link 307 by access interface 305. Likewise, device 301 could be connected to or otherwise in communication with access link 308 by access interface 306. Traffic generation system 302 is connected to access selection system 304. Access selection system is connected to access interface 305 and access interface 306.

Service network 309 could be any system, network, or collection of networks capable of providing a service to device 301. Examples of services include, but are not limited to, voice calling, video, text messaging, email, and data services. Other types of service are possible. Service network 309 could be, for example, a public internet, private intranet, the public switched telephone network, a cellular telephone network, a wide area data network, a local area network, or any combination thereof. Other elements, such as a service node, are possible but are not shown for purposes of clarity.

Access links 307 or 308 could be any well known access links or networks capable of transferring, carrying, or otherwise exchanging traffic between device 301 and service network 309. Access links 307 and 308 could comprise well known access links, such as wireless or landline communication links. For instance, either access link 307 or 308 could be a landline digital subscriber loop (DSL) link, a landline coaxial cable link, a landline passive optical network (PON) link, a wireless WiFi link, a wireless GSM or EVDO link, or a wireless WiMax link. In some cases, access link 307 or 308 could be considered a communication backhaul link. For instance, either access link 307 or 308 could comprise a time division multiplexed link, an Ethernet link provided by a cable operator, or a WiMax link.

Device 301 could be any well known device or communication system, such as a mobile phone, a personal computer, a pager, or a personal digital assistant. In operation, device 301 exchanges traffic over either access system 307 or access system 308 in order to access a service provided by service network 309.

In particular, device 301 includes traffic generation system 302. Traffic generation system 302 could be any system or collection of systems capable of executing or otherwise running applications to generate application traffic for the service provided by service network 309. Traffic generation system 302 could be capable of generating traffic having an application identifier included therein. Traffic generation system 302 could further be capable of interfacing with access selection system 304 to transfer the generated traffic to the service.

Access selection system 304 switches, routes, or otherwise directs the traffic to either access interface 305 or access interface 306 for transfer to either service network 309 via access links 307 or 308. Access interfaces 305 and 306 could be well known interface systems capable of communicating with access links 307 and 308. Access interfaces 305 and 306 could include well known elements, such as transceiver systems, not shown for purposes of clarity.

Figure 4:
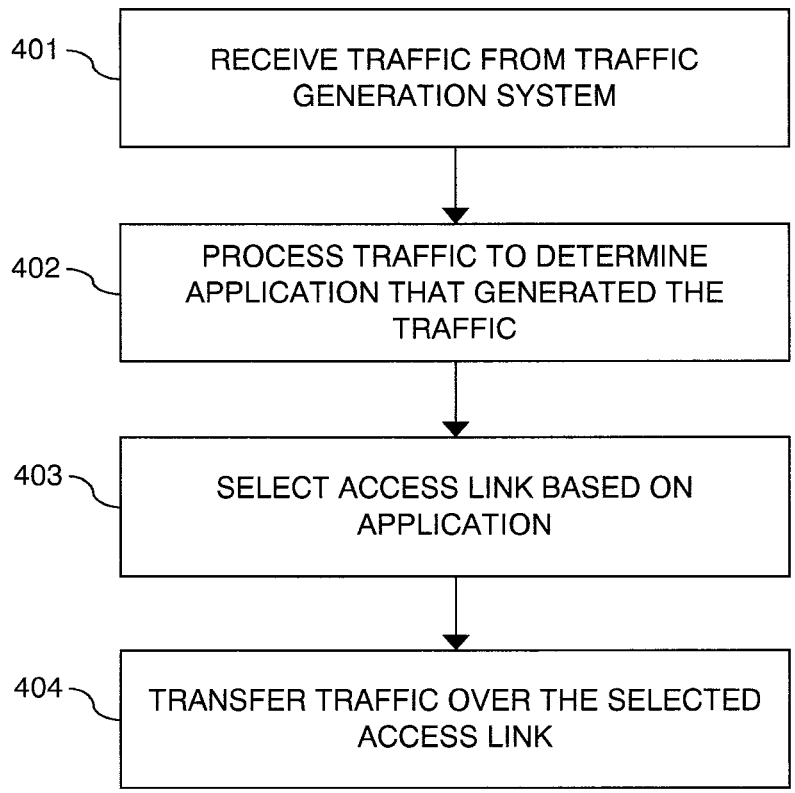
FIG. 4 illustrates the operation of an access selection system in an embodiment of the invention.

FIG. 4 illustrates the operation of access selection system 304 in an embodiment of the invention whereby access selection system 304 selects which access link 307 or 308 to utilize for transport of application traffic.

To begin, access selection system 304 receives traffic from traffic generation system 302 (Step 401) for transfer to either service network 309 over access link 307 or 308. As discussed above, the traffic is generated by traffic generation system 302 executing any one application of a number of applications capable of generating traffic. Examples of applications include, but are not limited to, voice calling, video, text messaging, email and other data applications.

In an example, the traffic could include an application identifier that identifies the application. The identifier could be a bit pattern. Access selection system 304 could include a first data structure, such as a table, that stores known application identifiers in association with the identity of applications. Each application identifier could be stored in association with one of the application identities. As discussed, in a case wherein the application identifiers are bit patterns, each bit pattern could be stored in association with one of the application identifiers. For instance, a first bit pattern could be associated with an email. A second bit pattern could be associated with voice calling. A third bit pattern could be associated with text messaging. A further bit pattern could be associated with a video application. Other bit patterns and associated applications are possible.

In another example, the traffic could be generated without an application identifier. In one case, access selection system 304 could inspect the traffic to determine the application that generated the traffic. For instance, the traffic could comprise packets or frames. Access selection system 304 could employ a deep packet inspection mechanism or scheme to inspect the payload of the traffic. Each possible application could generate traffic having identifiable patterns in the payload of the traffic. For example, voice traffic could have one payload pattern, while email traffic could have another payload patterns. Access selection system 304 could inspect the payload to determine a payload pattern. The payload pattern could then be compared to a known list of payload patterns and applications associated with the payload patterns. Access selection system 304 could then derive the identity of the application that generated the traffic from the pattern exhibited in the traffic payload.

In another case, access selection system 304 could be aware of which application generated which traffic based on a state mechanism, a control channel, or some other application identification mechanism within device 301. In this manner, access selection system 304 could derive the identity of the application from the application identification mechanism.

It should be understood that the step of determining the application that generated the traffic could be performed on each instance of traffic, such as a frame or a packet, received into access system 102. However, the application could also be determined on an intermittent or periodic basis.

Access selection system 304 could also include a second data structure, such as a table, that stores the identity of preferred access links for each application. Higher performance access links could be preferred for certain applications that require higher performance traffic, such as voice and video applications. In one example, a TDM link could be preferred for voice or video traffic. Access links having lesser performance characteristics could be preferred for certain applications that do not require high performance access links, such as email and other simple data applications. In one example, an Ethernet or WiMax link could be preferred for email, text, or data traffic. The data structure could indicate each access link and the preferred applications associated with each access link.

It should be understood that access links could be assigned or associated to application types based on factors other than the performance requirement of an application or the performance capabilities of an access link. For instance, a high cost access link could be preferred for an application based on the economic value of an application. Ring tones, for example, are considered high value applications. Therefore, a high cost access link may be preferred for ring tones Likewise, text messaging is considered a high value application. Therefore, a high cost access link may be preferred for text messaging. Other applications, such as email, web surfing, and streaming media may be considered low value applications. Therefore, low cost access links may be preferred for traffic generated by those low value applications. Such relationships could be embodied in the table described above that stores application types in association with preferred access links.

Next, access selection system processes the traffic to determine which one application of the number of applications generated the traffic (Step 402). For example, access selection system 304 could process the traffic to determine the application identifier. Access selection system 304 could then perform a lookup to the second data structure using the application identifier to determine the application identity stored in association with the application identifier.

Access selection system 304 then selects from either access link 307 or 308 which access link to user for transferring the traffic to the service (Step 403). For example, access selection system 304 could access and process the second data structure to determine the preferred access link (in this embodiment, either access link 307 or 308) for the application associated with the traffic.

After selection the preferred access link, access selection system 304 transfers the traffic over the selected access link 307 or 308 to either service network 309 (Step 404). In operation, either service network 309 transfers the traffic to the service.

Advantageously, communication network 300 and access selection system 304 allow a carrier to match traffic with preferred access links based on the application that generated the traffic. In this manner, low value traffic can be assigned to low cost access links. Furthermore, high value traffic can be assigned to high cost access links. Similarly, high performance traffic can be assigned to high performance access links. Likewise, low performance traffic can be assigned to low performance access links.

Figure 5:
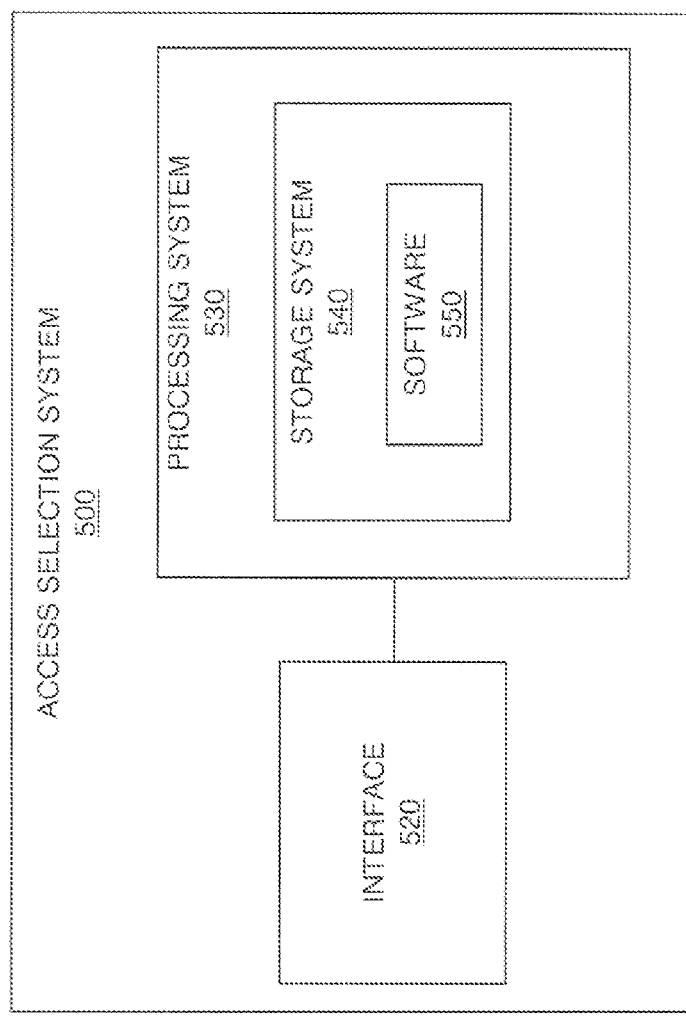
FIG. 5 illustrates an access selection system in an embodiment of the invention.

FIG. 5 illustrates access selection system 500 in an embodiment of the invention. Access selection system 500 includes interface 520, processing system 530, storage system 540, and software 550. Storage system 540 stores software 550. Processing system 530 is linked to interface 520. Access selection system 500 could be comprised of a programmed general-purpose computer, although those skilled in the art will appreciate that programmable or special purpose circuitry and equipment may be used.

Interface 520 could comprise a network interface card, modem, port, communication bus interface, or some other interface system. Processing system 530 could comprise a computer microprocessor, logic circuit, or some other processing device. Processing system 530 may be distributed among multiple processing devices. Storage system 540 could comprise a disk, tape, integrated circuit, or some other memory device or system. Storage system 540 may be distributed among multiple memory systems.

Processing system 530 retrieves and executes software 550 from storage system 540. Software 550 may comprise an operating system, utilities, drivers, networking software, and other software typically loaded onto a general-purpose computer. Software 550 could also comprise an application program, firmware, or some other form of machine-readable processing instructions. When executed by the processing system 530, software 550 directs processing system 530 to operate as described above for access selection systems 106 and 304.

Those skilled in the art will appreciate variations from these embodiments that fall within the scope of the invention. Those skilled in the art will appreciate that the features described above can be combined in various ways to form multiple embodiments of the invention. As a result, the invention is not limited to the specific embodiments described above, but only by the claims and their equivalents.

What is claimed is:

1. A method of operating an access selection system, the method comprising:

receiving a plurality of traffic wherein the plurality of traffic is comprised of packets and wherein the plurality of traffic is generated by a plurality of applications executing on a plurality of devices;

processing a first bit pattern included in a first traffic of the plurality of traffic, wherein the first bit pattern is associated with a first application of the plurality of applications that generated the first traffic, against a plurality of known bit patterns to select the first application;

processing a second bit pattern included in a second traffic of the plurality of traffic, wherein the second bit pattern is associated with a second application of the plurality of applications that generated the second traffic, against the plurality of known bit patterns to select the second application;

selecting a first access link from a plurality of access links based on the first application;

selecting a second access link from the plurality of access links based on the second application;

transferring the first traffic over the first access link; and transferring the second traffic over the second access link.

2. The method of claim 1 wherein receiving the plurality of traffic comprises receiving the plurality of traffic from the plurality of devices over a plurality of wireless communication links.

3. The method of claim 1 wherein each known bit pattern of the plurality of known bit patterns is associated with a different one of the plurality of applications.

4. The method of claim 1 wherein the first access link comprises an Ethernet link.

5. The method of claim 1 wherein the first access link comprises a WiMax link.

6. The method of claim 1 wherein the first access link comprises a time division multiplexed (TDM) link.

7. The method of claim 1 wherein the first and second applications of the plurality of applications each comprise one of the following: a voice calling application, a video application, a text messaging application, or an email application.

8. An access selection system comprising:

an interface system configured to receive a plurality of traffic wherein the plurality of traffic is comprised of packets and wherein the plurality of traffic is generated by a plurality of applications executing on a plurality of devices;

the interface system further configured to transfer a first traffic of the plurality of traffic over a first access link and transfer a second traffic of the plurality of traffic over a second access link; and a processing system coupled to the interface system and configured to process a first bit pattern included in the first traffic of the plurality of traffic, wherein the first bit pattern is associated with a first application of the plurality of applications that generated the first traffic, against a plurality of known bit patterns to select the first application and select the first access link from the plurality of access links based on the first application;

the processing system further configured to process a second bit pattern included in the second traffic of the plurality of traffic, wherein the second bit pattern is associated with a second application of the plurality of applications that generated the second traffic, against the plurality of known bit patterns to select the second application and select the second access link from the plurality of access links based on the first application.

9. The access selection system of claim 8 wherein the interface system is configured to receive the plurality of traffic from the plurality of devices over a plurality of wireless communication links.

10. The access selection system of claim 8 wherein each known bit pattern of the plurality of known bit patterns is associated with a different one of the plurality of applications.

11. The access selection system of claim 8 wherein the first access link comprises an Ethernet link.

12. The access selection system of claim 8 wherein the first access link comprises a WiMax link.

13. The access selection system of claim 8 wherein the first access link comprises a time division multiplexed (TDM) link.

14. The access selection system of claim 8 wherein the first and second applications of the plurality of applications each comprise one of the following: a voice calling application, a video application, a text messaging application, or an email application.

* * * * *